(12) United States Patent
Chae et al.

(10) Patent No.: US 7,724,324 B2
(45) Date of Patent: May 25, 2010

(54) COLOR FILTER ARRAY SUBSTRATE, A LIQUID CRYSTAL DISPLAY PANEL AND FABRICATING METHODS THEREOF

(75) Inventors: Gee Sung Chae, Yeonsu-gu (KR); Tae Joon Song, Suwon si (KR)

(73) Assignee: LG Display Co., Ltd., Seoul (KR)

(*) Notice: Subject to any disclaimer, the term of this patent is extended or adjusted under 35 U.S.C. 154(b) by 128 days.

(21) Appl. No.: 12/005,629

(22) Filed: Dec. 28, 2007

(65) Prior Publication Data
US 2008/0259255 A1 Oct. 23, 2008

(30) Foreign Application Priority Data
Apr. 19, 2007 (KR) .................. 10-2007-0038436

(51) Int. Cl.
*G02F 1/1335* (2006.01)
(52) U.S. Cl. .............. 349/106; 349/155; 349/156; 349/157; 349/117; 349/118; 349/119
(58) Field of Classification Search ......... 349/155–157, 349/106
See application file for complete search history.

(56) References Cited

U.S. PATENT DOCUMENTS

| | | | | |
|---|---|---|---|---|
| 6,577,374 | B1 * | 6/2003 | Nakata et al. ............... | 349/156 |
| 6,618,113 | B1 * | 9/2003 | Ulrich et al. ................ | 349/156 |
| 7,286,199 | B2 | 10/2007 | Moriya | |
| 7,532,299 | B2 * | 5/2009 | Paek et al. .................. | 349/187 |
| 2005/0231669 | A1 * | 10/2005 | Kim ........................... | 349/138 |
| 2006/0055848 | A1 | 3/2006 | Kim et al. | |
| 2006/0146267 | A1 * | 7/2006 | Choi et al. .................. | 349/156 |
| 2006/0250568 | A1 * | 11/2006 | Penterman et al. .......... | 349/183 |
| 2006/0262262 | A1 | 11/2006 | Kim et al. | |

FOREIGN PATENT DOCUMENTS

JP     2005-024920     1/2005

* cited by examiner

*Primary Examiner*—David Nelms
*Assistant Examiner*—Thanh-Nhan P Nguyen
(74) *Attorney, Agent, or Firm*—McKenna Long & Aldridge LLP

(57) ABSTRACT

A liquid crystal display panel includes: a thin film transistor array substrate; a color filter array substrate opposite the thin film transistor array substrate; and a liquid crystal layer between the thin film transistor array substrate and the color filter array substrate, wherein the color filter array substrate includes: a black matrix partitioning sub pixels; a plurality of color filters at respective sub pixels; and a spacer-integrated planarizing layer arranged on the color filters and the black matrix, wherein the spacer-integrated planarizing layer includes a planarized surface at each of the sub pixels and a spacer pattern integrated with the planarized surface and protruding at the black matrix to maintain a cell gap between the thin film transistor array substrate and the color filter array substrate, wherein the spacer-integrated planarizing layer includes a liquid crystalline material.

15 Claims, 15 Drawing Sheets

COLOR FILTER ARRAY SUBSTRATE, A LIQUID CRYSTAL DISPLAY PANEL AND FABRICATING METHODS THEREOF

This application claims the benefit of Korean Patent Application No. 10-2007-038436, filed on Apr. 19, 2007, which is hereby incorporated by reference for all purposes as if fully set forth herein.

BACKGROUND OF THE INVENTION

1. Field of the Invention

The present invention relates to a liquid crystal display panel, and more particularly, to a liquid crystal display panel and a method for fabricating the same, wherein a fabrication process of a color filter array can be simplified.

2. Discussion of the Related Art

Liquid crystal display devices (LCDs) control light transmittance of liquid crystal cells according to a video signal to allow the liquid crystal cells to display an image corresponding to the video signal on a liquid crystal display panel arranged in the form of a matrix. In order to realize this operation, liquid crystal display devices (LCDs) include a liquid crystal display panel, where liquid crystal cells are arranged in the form of an active matrix, and driving circuits to drive the LCD panel.

Referring to FIG. 1, the liquid crystal display panel includes a upper substrate 2 where a color filter array is formed, a lower substrate 22 where a thin film transistor array 22 is formed, and a liquid crystal 11 interposed in the cell gap between the upper substrate 2 and the lower substrate 22, a lower polarizing film 21 adhered to a light-incident plane, a upper polarizing film 1 adhered to a light-emitting plane, and a compensation film 3 interposed between the lower upper substrate 2 and the upper polarizing film 1. The compensation film 3 may be further arranged between the lower polarizing film 21 and the lower substrate 22.

The color filter array includes a black matrix 4, a color filter 6, a planarizing layer 7 and an upper alignment layer 8 arranged on the upper substrate 2.

The thin film transistor array includes a thin film transistor (hereinafter, referred to simply as "TFT"), a common electrode 13, a pixel electrode 18 and a lower alignment layer 28 arranged on the lower substrate 22.

The upper substrate 2 and the lower substrate 22 are joined to each other such that the color filter array faces the thin film transistor array. The spacer 10 serves to maintain the cell gap between the two substrates.

In the color filter array, the black matrix 4 overlaps a region corresponding to the TFT of the thin film transistor array and a region corresponding to gate lines and data lines (not shown), and partitions the sub pixels. The color filter 6 is formed at each sub pixel partitioned by the black matrix 4. The sub pixel includes repeated filter patterns of R, G and B sub pixels, and may further include a W sub pixel to improve brightness. The color filter 6 includes R, G and B color filters, which render red, green and blue, respectively. When the sub pixel further includes a W sub pixel, the color filter 6 further includes a W color filter pattern at the W sub pixel. The planarizing layer 7 is formed to cover the color filter and levels out the upper substrate 2.

In the thin film transistor array, the TFT includes a gate electrode 12 connected to a gate line (not shown), a gate insulating film 24, a semiconductor pattern 14 overlapping the gate electrode 12, and a source electrode 40 in ohmic contact with the semiconductor pattern 14 and connected to the data line (not shown) that crosses the gate line, and a drain electrode 17 spaced apart from the source electrode 40 and arranged to be in ohmic contact with the semiconductor pattern 14. The TFT supplies a pixel signal through a data line to a pixel electrode 18, in response to a scanning signal through the gate line. The pixel electrode 18 is in contact with the drain electrode 17 of the TFT through a contact hole in a protective film 26. A common electrode 13 is formed in the form of a stripe such that it is alternately arranged with the pixel electrode 18. The common electrode 13 applies a common voltage which is a base voltage of liquid crystal driving.

An upper alignment film 8 and a lower alignment film 28 allow the liquid crystal 11 to be uniformly aligned.

The liquid crystal 11 rotates in accordance with an electric field generated by the common voltage supplied from the common electrode 13 and the pixel voltage supplied from the pixel electrode 18 to control light-transmittance.

An upper polarizing film 1 and a lower polarizing film 21 allow non-polarized incident lights to be linearly polarized.

Light incident to the LCD panel is linearly polarized through the lower polarizing film 21 and is transmitted to the liquid crystal 11 having refractive index anisotropy. At the same time, the light is vertically or obliquely transmitted to the liquid crystal 11. Lights that transmit the upper polarized film in respective directions have different retardation values due to the liquid crystal 11, thus causing a phase-difference. The phase-difference resulting from the transmission directions varies the properties of the transmitted lights, according to a viewing angle. The compensation film 3 offsets the optical phase-difference and thus improves viewing angle properties of the LCD panel.

FIGS. 2A and 2D are sectional views sequentially illustrating a method for fabricating the color filter array shown in FIG. 1.

An opaque resin is applied over the entire surface of an upper substrate 2 and is then patterned by photolithographic and etching processes using a first mask, to form a black matrix 4, as shown in FIG. 2A.

A red resin is deposited on the upper substrate 2 including the black matrix 4 and is then patterned by photolithographic and etching processes using a second mask, to form a red color filter pattern R, as shown in FIG. 2B. In the same manner, a green, blue, and white color filter patterns G, B and W are sequentially formed using a third, fourth, and fifth mask, respectively. Green, blue and transparent resins are used to form the green, blue, and white color filter patterns G, B and W, respectively. Although no white color filter pattern W is formed, brightness may be improved. Unless there is any white color filter pattern W, the planarizing layer 7 cannot offset the step between W sub pixels. Accordingly, it is preferable to form the white color filter pattern W, in terms of efficient planarization of the upper substrate 1, where the color filter 6 is formed.

An organic material is deposited over the entire surface of the upper surface 2 including the color filter 6 to form a planarizing layer 7, as shown in FIG. 2C. The planarizing layer 7 eliminates the topology of the sub pixels which is caused by the black matrix 2 composed of an opaque resin.

A spacer material is applied over the entire surface of the planarizing layer 7 and is then patterned by photolithographic and etching processes using a sixth mask, to form a spacer 10, as shown in FIG. 2D.

As such, at least six mask processes are required for the fabrication of the color filter array. Each of the mask processes includes a photolithographic process, which is a photographic process including a series of the steps of involving applying, exposing and developing a photoresist. The photolithographic process requires long process times and high equipment costs.

The upper substrate 1 including the thin film transistor array is joined to the lower substrate 21 including the color filter array, the liquid crystal 11 is interposed in the cell gap, and a compensation film 3 and polarized films 1 and 2 are adhered. The compensation film 3 improves display quality of the LCD panel, but has the disadvantage of causing increases in material costs and fabrication process time.

SUMMARY OF THE INVENTION

Accordingly, the present invention is directed to a color filter array substrate, a liquid crystal display panel and fabricating methods thereof that substantially obviate one or more problems due to limitations and disadvantages of the related art.

An advantage of the present invention is to provide a simplified fabrication process of a color filter array.

Another advantage of the present invention to reduce an adhesion process of a compensation film.

Additional features and advantages of the invention will be set forth in part in the description which follows, and in part will be apparent from the description, or may be learned by practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described, a liquid crystal display panel, includes: a thin film transistor array substrate; a color filter array substrate opposite the thin film transistor array substrate; and a liquid crystal layer between the thin film transistor array substrate and the color filter array substrate, wherein the color filter array substrate includes: a black matrix partitioning sub pixels; a plurality of color filters at respective sub pixels; and a spacer-integrated planarizing layer arranged on the color filters and the black matrix, wherein the spacer-integrated planarizing layer includes a planarized surface at each of the sub pixels and a spacer pattern integrated with the planarized surface and protruding at the black matrix to maintain a cell gap between the thin film transistor array substrate and the color filter array substrate, wherein the spacer-integrated planarizing layer includes a liquid crystalline material.

In another aspect of the present invention, a method of manufacturing a liquid crystal display panel, includes: forming a color filter array substrate; positioning the color filter array substrate opposite to a thin film transistor array substrate; and forming a liquid crystal layer between the thin film transistor array substrate and the color filter array substrate, wherein the step of forming the color filter array substrate includes: forming a black matrix partitioning sub pixels; forming a plurality of color filters at respective sub pixels; and forming a spacer-integrated planarizing layer arranged on the color filters and the black matrix, wherein the spacer-integrated planarizing layer includes a planarized surface at each of the sub pixels and a spacer pattern integrated with the planarized surface and protruding at the black matrix to maintain a cell gap between the thin film transistor array substrate and the color filter array substrate, wherein the spacer-integrated planarizing layer includes a liquid crystalline material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention. In the drawings.

DETAILED DESCRIPTION OF THE ILLUSTRATED EMBODIMENTS

Reference will now be made in detail to embodiments of the present invention, example of which is illustrated in the accompanying drawings. Wherever possible, the same reference numbers will be used throughout the drawings to refer to the same or like parts.

Referring to FIGS. 3 to 6, embodiments of the present invention will be described.

Figure 1:
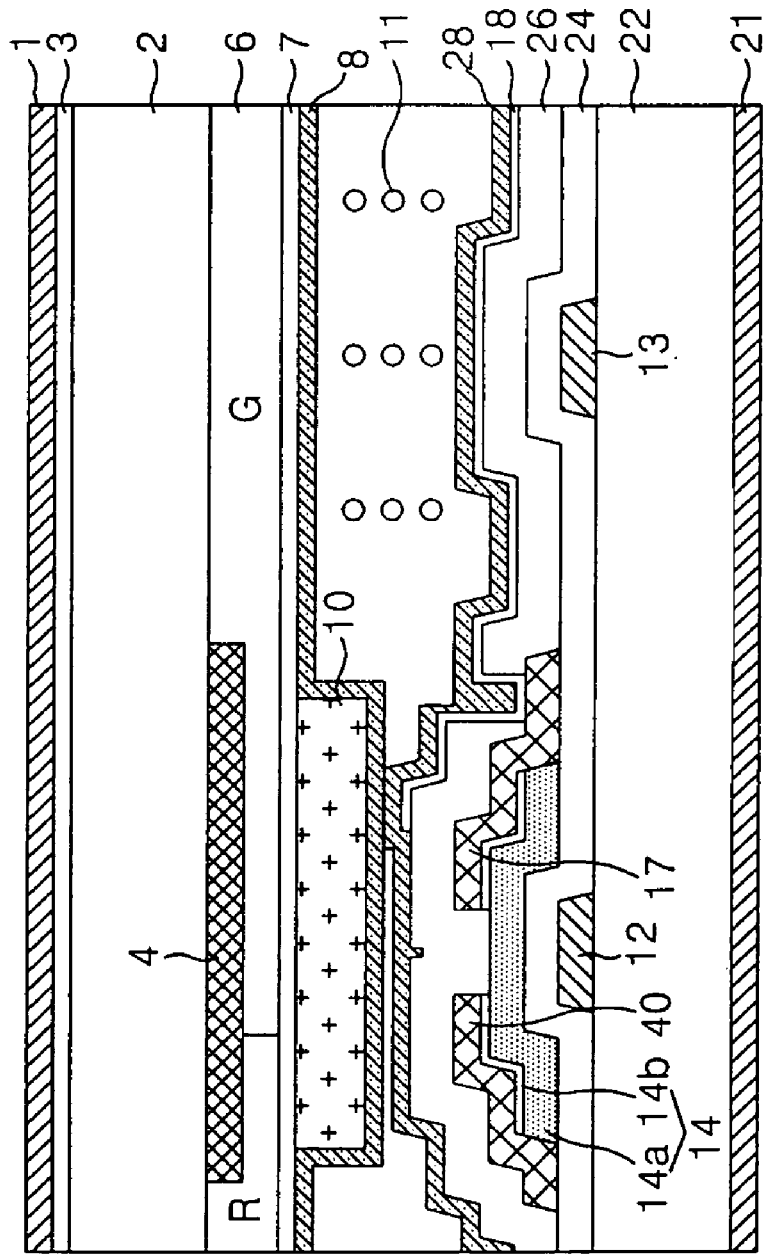
FIG. 1 is a sectional view illustrating a related art liquid crystal display panel.
Figure 2A:
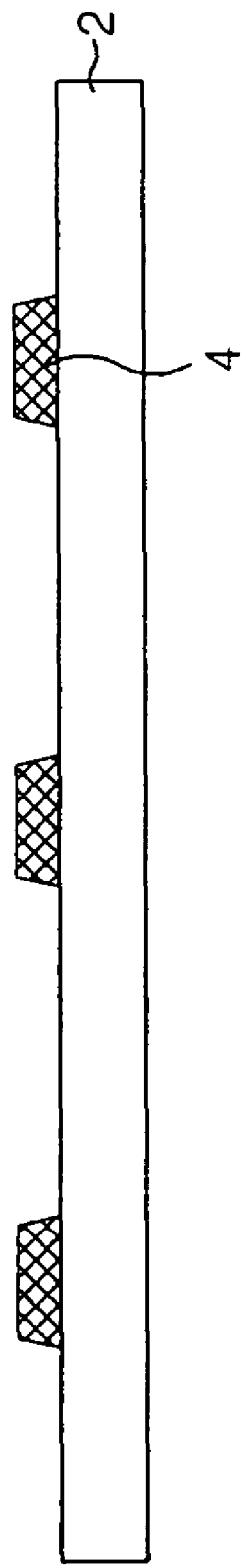
FIGS. 2A and 2D are sectional views sequentially illustrating a process for fabricating a color filter array of a related art liquid crystal display panel.
Figure 2B:
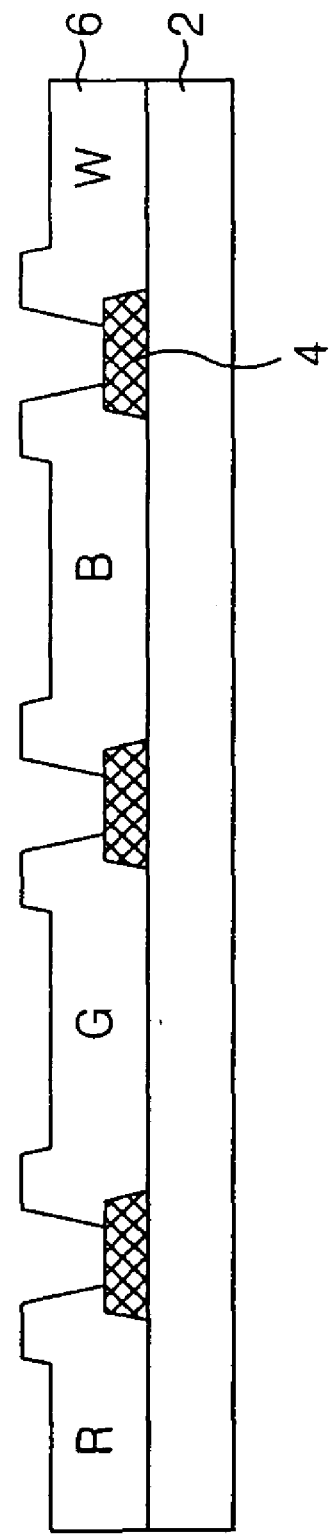
Figure 2C:
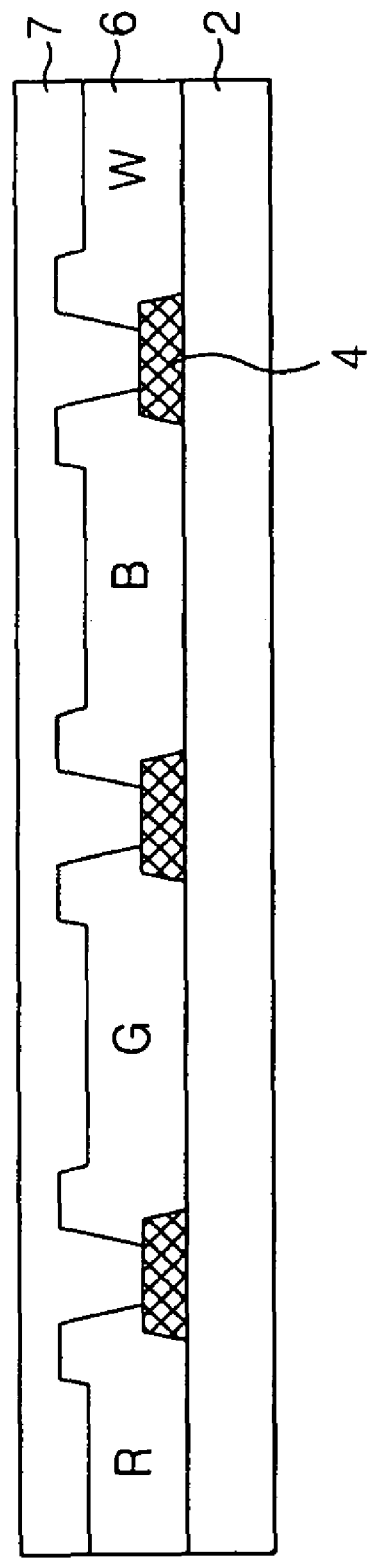
Figure 2D:
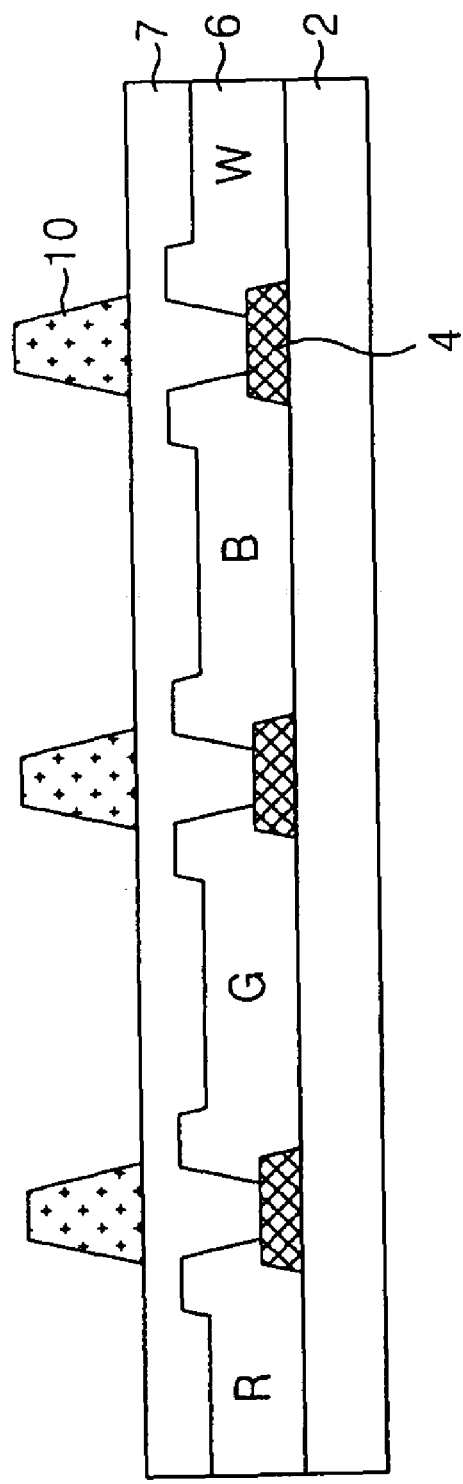
Figure 3:
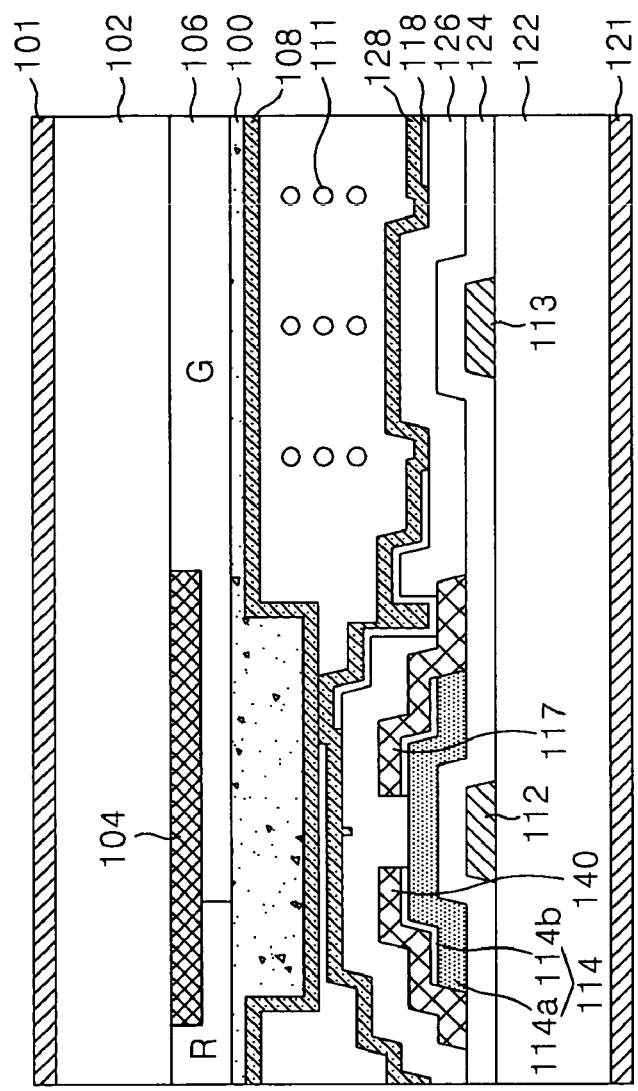
FIG. 3 is a sectional view illustrating a liquid crystal display panel according to one embodiment of the present invention.

Referring to FIG. 3, the LCD panel includes a upper substrate 102 where a color filter array is formed, a lower substrate 122 where a thin film transistor array is formed, and a liquid crystal 111 interposed in the cell gap between the upper substrate 102 and the lower substrate 122, a lower polarizing film 121 adhered to a light-incident plane, and a upper polarizing film 101 adhered to a light-emitting plane.

The color filter array includes a black matrix 104, a color filter 106, a spacer-integrated planarizing layer 100 and an upper alignment layer 108 arranged on the upper substrate 102.

The thin film transistor array includes a thin film transistor (hereinafter, referred to simply as "TFT"), a common electrode 113, a pixel electrode 118 and a lower alignment layer 128 arranged on the lower substrate 122.

The upper substrate 102 and the lower substrate 122 are joined to each other such that the color filter array faces the thin film transistor array. A cell gap is maintained by a spacer-integrated planarizing layer 100 between the two substrates.

In the color filter array, the black matrix 104 overlaps a region corresponding to the TFT of the thin film transistor array and a region corresponding to gate and data lines (not shown), and partitions sub pixels. The black matrix 104 serves to prevent leakage of lights and increase a contrast by absorbing external lights. The color filter 106 is formed at sub pixels partitioned by the black matrix 4. The sub pixels include R, G and B sub pixels, and may further include a W sub pixel in order to improve brightness. The color filter 106 includes R, G, and B color filter patterns arranged in the R, G and B sub pixels, respectively, other than the transparent sub pixel W. The R, G, and B color filter patterns render red, green and blue, respectively. The spacer-integrated planarizing layer 100 eliminates the topology caused by the black matrix 104 and the W sub pixel where there is no color filter 106. The spacer-integrated planarizing layer 100 is composed of a liquid crystalline material and may offset the phase retardation difference of light transmitted through liquid crystal cells in a large viewing angle range. Similar to a bulk liquid crystal, the liquid crystalline material included in the spacer-integrated planarizing layer 100 contains a reactive mesogen which has a constant (not variable) phase retardation value. The spacer-integrated planarizing layer 100 includes a planarized surface in an effective display side at respective sub pixels, and a spacer pattern integrated with the planarized surface and protruding from the boundary, i.e., the black matrix 104, between adjacent two sub pixels.

The spacer-integrated planarizing layer 100 acts as not only a planarizing layer to level out the sub pixel, but also as a spacer to maintain the cell gap. The planarized surface of the spacer-integrated planarizing layer 100 enables the upper alignment film 108 to be evenly and uniformly formed on the effective display side at each sub pixel, thus rendering the liquid crystal 111 to be uniformly aligned.

The reactive mesogen has liquid crystalline properties. Accordingly, optimizing the refractive index anisotropy and thickness of the reactive mesogen enables control of phase retardation values. The reactive mesogen may be included in the alignment film which allows the reactive mesogen to be aligned in conformity with optical properties of the spacer-integrated planarizing layer 100.

For example, in the case where the spacer-integrated planarizing layer 100 has a negative C-plate property (nz<nx=ny, in which nx, ny and nz are the refractive indices in the x, y and z directions, respectively) at respective sub pixels, an alignment film may be excluded. For this reason, an additional alignment film may be excluded.

Figure 7:
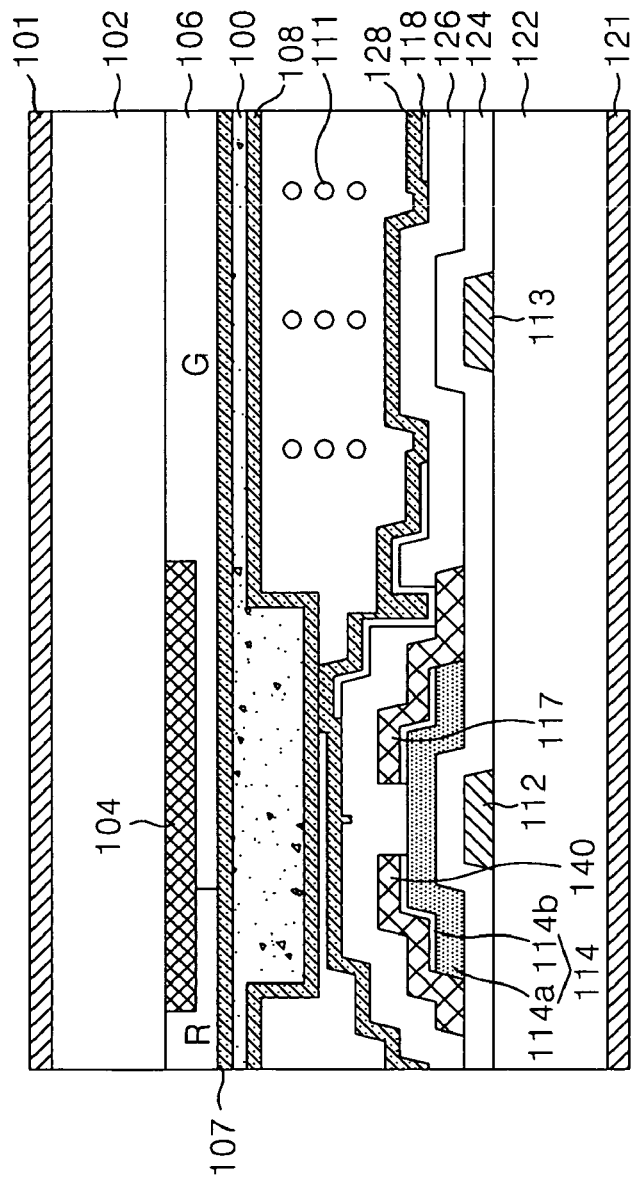
FIG. 7 is a sectional view illustrating a liquid crystal display panel according to one embodiment of the present invention.

As another example, when the spacer-integrated planarizing layer 100 has an A-plate property (nx>ny=nz, in which nx, ny and nz are the refractive indices in the x, y and z directions, respectively) at respective sub pixels, the reactive mesogen may be aligned in conformity with the A-plate property. Accordingly, the LCD panel according to the embodiments of the present invention may further include an alignment film 107 to align the reactive mesogen. The alignment film 107 may be arranged between the color filter 106 and the spacer-integrated planarizing layer 100 shown in FIG. 7.

In the thin film transistor array, the TFT includes a gate electrode 112 connected to a gate line (not shown), a gate insulating film 124, a semiconductor pattern 114 overlapping the gate electrode 112, and a source electrode 140 in ohmic contact with the semiconductor pattern 114 and connected to the data line (not shown) that crosses the gate line, and a drain electrode 117 spaced apart from the source electrode 140 and arranged to be in ohmic contact with the semiconductor pattern 114. The TFT supplies a pixel signal through a data line to a pixel electrode 118, in response to a scanning signal through the gate line. The pixel electrode 118 is in contact with the drain electrode 117 through a contact hole in a protective film 126. A common electrode 113 is formed in the form of a stripe such that it is alternatively arranged with the pixel electrode 118. The common electrode 113 applies a common voltage which is a base voltage of liquid crystal driving.

An upper alignment film 108 and a lower alignment film 128 render the liquid crystal 111 to be uniformly aligned.

The liquid crystal 111 rotates in accordance with an electric field generated by the common voltage supplied from the common electrode 113 and the pixel voltage supplied from the pixel electrode 118 to control light-transmittance.

An upper polarizing film 101 and a lower polarizing film 121 allow non-polarized incident light to be linearly polarized.

Light incident to the LCD panel is linearly polarized through the lower polarizing film 121 and transmitted to the liquid crystal 111 having refractive index anisotropy. At the same time, the light is vertically or obliquely transmitted to the liquid crystal 111. Lights that transmit the upper polarized film in respective directions have different retardation values by the liquid crystal 111, thus causing phase-difference. The phase retardation difference resulting from the transmission directions varies the properties of the transmitted light according to a viewing angle. The spacer-integrated planarizing layer 100 may offset the optical phase-difference and thus improve viewing angle properties of the LCD panel.

As mentioned above, the LCD panel according to the embodiment of the present invention includes, in addition to the liquid crystalline material, the spacer-integrated planarizing layer 100 which includes a planarized surface arranged in an effective display side at each sub pixel, and a spacer pattern that is integrated with the planarized surface and protruding from the black matrix 104. The spacer-integrated planarizing layer 100 simultaneously functions to improve viewing angle properties of the LCD panel, planarize the sub pixels and maintain the cell gap. In conclusion, the method for fabricating the LCD according to the embodiment of the present invention reduces an adhesion process of a compensation film and eliminates separately forming a planarizing layer and a spacer, thus simplifying the overall color filter array process.

Figure 4A:
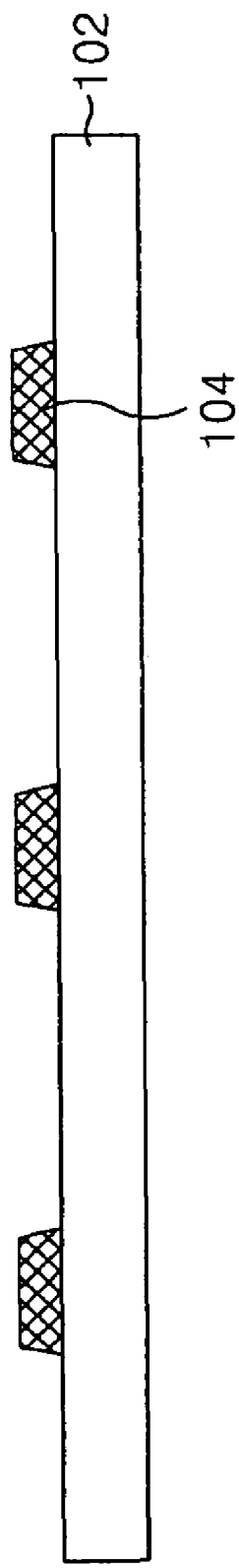
FIGS. 4A to 4C are sectional views more specifically illustrating a method for fabricating the color filter array shown in FIG. 3.
Figure 4B:
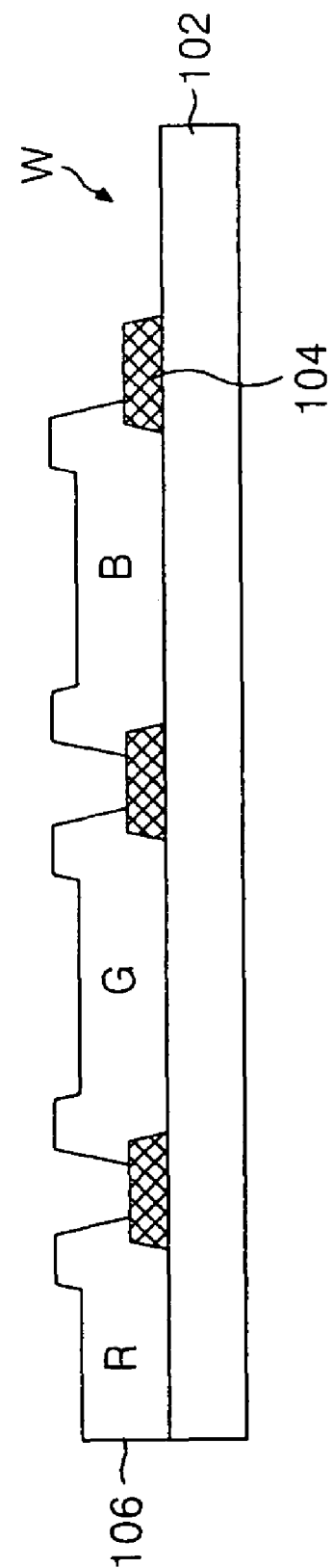
Figure 4C:
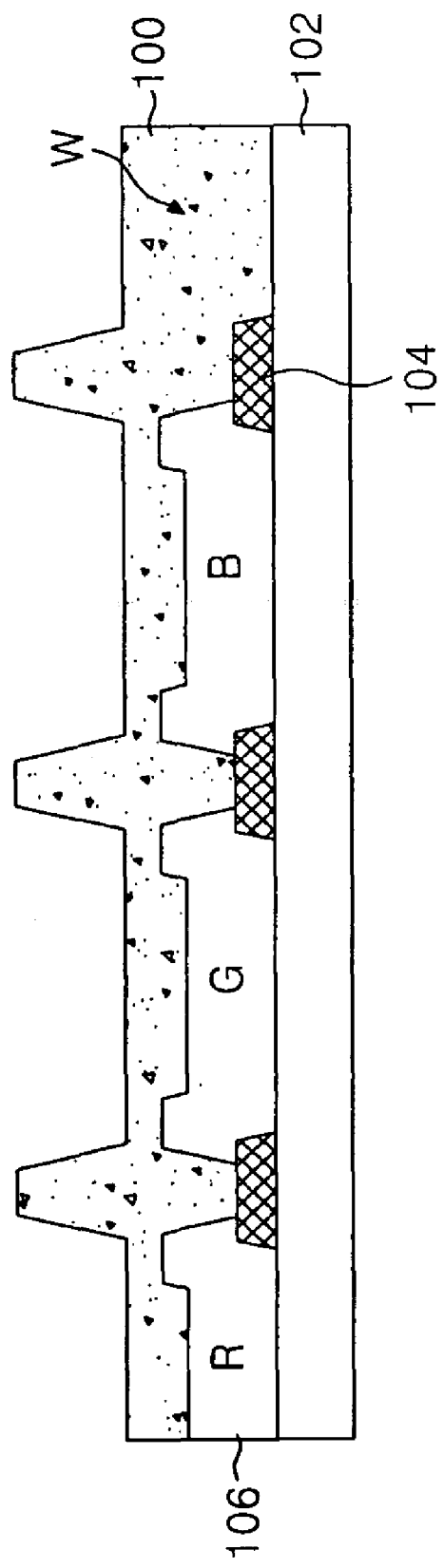

FIGS. 4A and 4C are sectional views sequentially illustrating a method for fabricating the color filter array shown in FIG. 3.

An opaque resin is applied over the entire surface of an upper substrate 102 and is then patterned by photolithographic and etching processes using a first mask, to form a black matrix 104, as shown in FIG. 4A. The black matrix 104 may be composed of a material such as chrome (Cr).

A red resin is deposited on the upper substrate 102 including the black matrix 104, and is then patterned by photolithographic and etching processes using a second mask, to form a red color filter pattern R, as shown in FIG. 4B. In the same manner, green and blue color filter patterns G and B are sequentially formed using third and fourth masks, respectively. Green and blue resins are used for the green and blue color filter patterns G and B, respectively. At this time, the second and fourth mask processes are carried out by shifting the same mask.

A liquid crystalline material-containing resin is coated onto the upper substrate 102 including the color filter 106. The resin is molded using a soft mold and is then photo-cured. The soft mold is separated from the cured resin, to form a spacer-integrated planarizing layer 100, as shown in FIG. 4C.

Figure 5A:
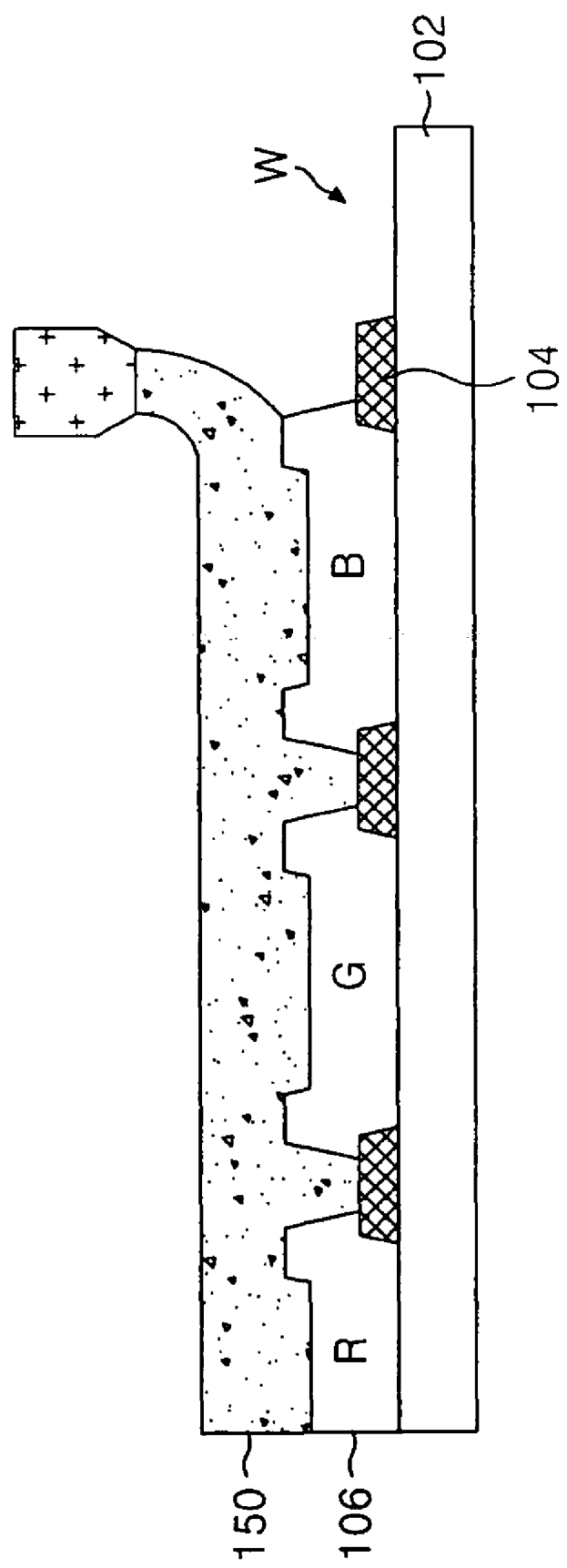
FIGS. 5A to 5C are sectional views more specifically illustrating a method for fabricating an optical compensation spacer of the color filter array shown in FIG. 3.
Figure 5B:
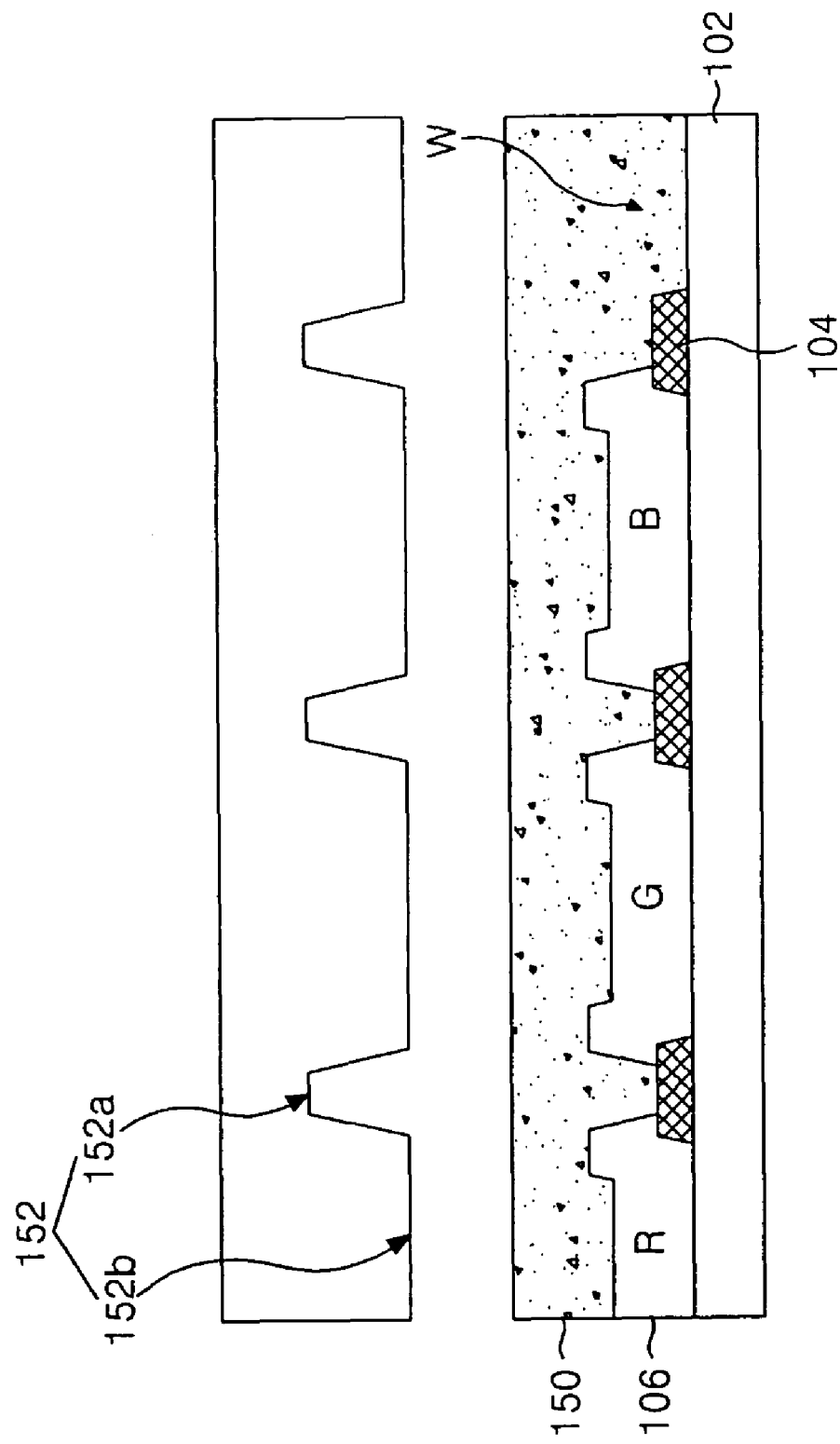
Figure 5C:
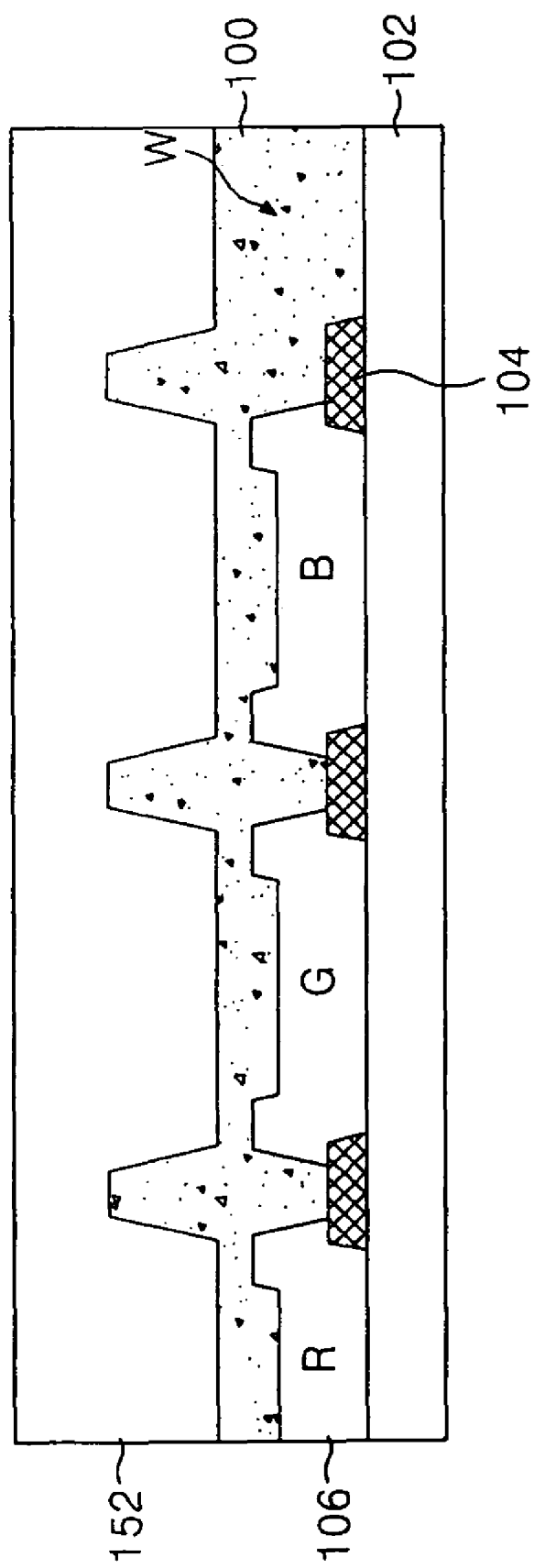

FIGS. 5A and 5C are sectional views more specifically illustrating a formation process of the spacer-integrated planarizing layer 100.

As shown in FIG. 5A, a liquid crystalline material-containing resin 150 is coated over the entire surface of the upper substrate 102 such that it covers the black matrix 104 and the color filter 106 and a transparent sub pixel W.

As shown in FIG. 5B, a soft mold 152 having a groove 152a and a protrusion 150b is aligned on the resin. The groove 152a of the soft mold 152 corresponds to a region of the black matrix 104. The soft mold 152 is composed of a highly elastic rubber material, e.g., a polydimethylsiloxane (PDMS) resin, a polyurethane acrylate (PUA) resin, or a cross-linked novolac resin.

The liquid crystalline material-containing resin 150 is molded in conformity with the shape of the soft mold 152 and then cured. The liquid crystalline material-containing resin 150 shifts into the groove 152a of the soft mold due to capillary force. Accordingly, as shown in FIG. 5C, the spacer-integrated planarizing layer 100 is formed in the pattern that is reverse-transferred to the shape of the soft mold. Because the protrusion 152b of the soft mold 152 corresponds to an effective display side at each sub pixel, the spacer-integrated planarizing layer 100 corresponding to the effective display side of the sub pixel has a flat surface.

When there is a need to form an alignment film, in order to impart desirable optical properties to the liquid crystalline material contained in the liquid crystalline material-containing resin 150 an alignment film may be formed to cover the entire surface of the upper substrate 102, prior to coating the resin. The alignment film may be composed of an organic material such as polyimide.

Figure 8:
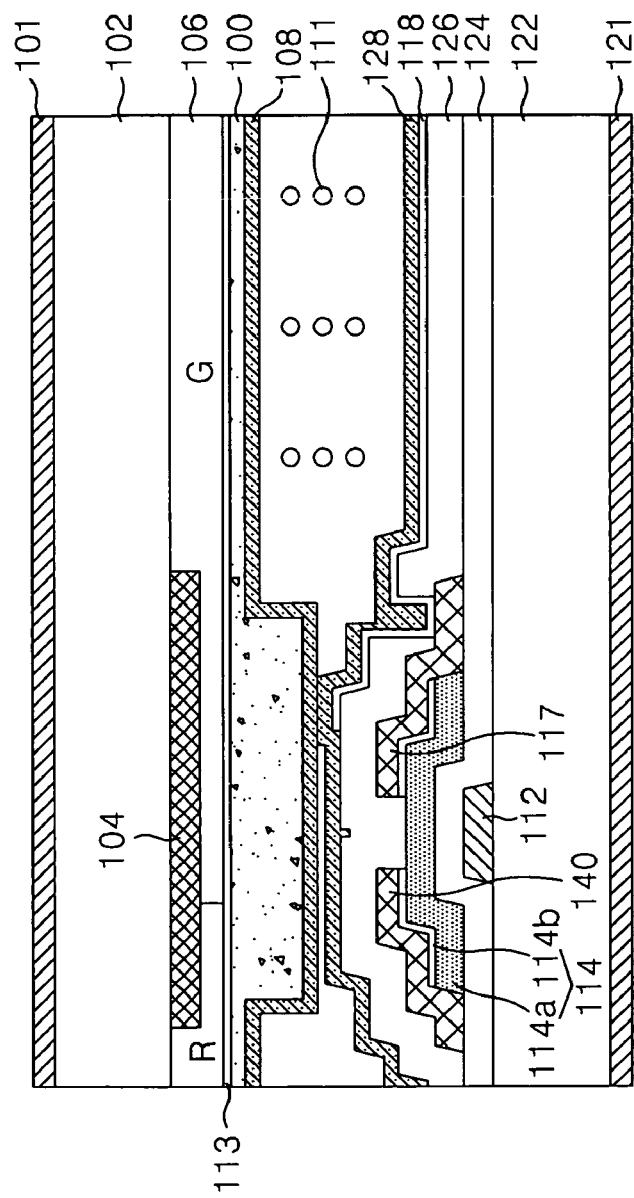
FIG. 8 is a sectional view illustrating a liquid crystal display panel according to one embodiment of the present invention.

A lateral electric field LCD panel, where a common electrode is formed on a lower substrate, has been illustrated in conjunction with FIGS. 3 to 5c. However, a vertical electric field LCD panel may be employed, where a common electrode 113 is formed on an upper substrate, and examples of the vertical electric field LCD panels include twisted nematic (TN), electrical controlled birefringence (ECB) and vertical alignment (VA) mode LCD panels shown in FIG. 8. When a vertical electric field LCD panel is formed, the common electrode 113 is formed over the entire surface of the upper substrate 102 prior to coating the liquid crystalline material-containing resin 150. Therefore, the common electrode 113 may be arranged between the color filters 106 and the spacer-integrated planarizing layer 100 shown in FIG. 8. The common electrode 113 may be composed of a material, e.g., indium tin oxide (ITO), tin oxide (TO), indium zinc oxide (IZO) or indium tin zinc oxide (ITZO). As such, when a common electrode 113 is formed on the upper substrate 102, an alignment film, to align the liquid crystalline material contained in the resin, is interposed between the liquid crystalline material-containing resin 150 and the common electrode 113.

The liquid crystalline material-containing resin 150 includes 30 to 40 vol % of a mono-functional monomer, 20 to 40 vol % of a di-functional monomer, 0 to 20 vol % of a tri-functional monomer, 10 vol % or more of a reactive mesogen and 1 to 3 vol % of a photoinitiator, based on a total 100 vol % of the resin.

Figure 6:
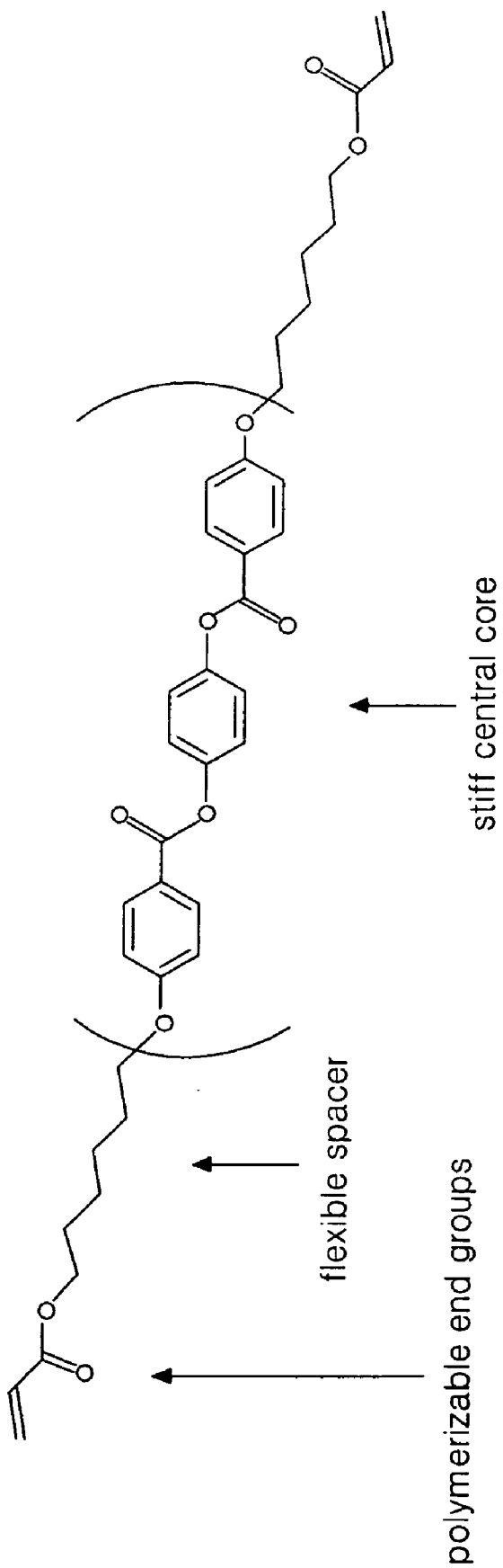
FIG. 6 is a view illustrating one embodiment of reactive mesogen.

As shown in FIG. 6, the reactive mesogen contains a central core with liquid-crystalline properties, a pair of photo-polymerizable end groups, and a pair of flexible spacers, each having one end bound to the central core and the other end bound to the photo-polymerizable end group.

In addition to the compound as shown in FIG. 6, the central core may be selected from compounds represented by Formulae I to III below:

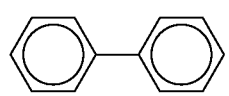
(I)

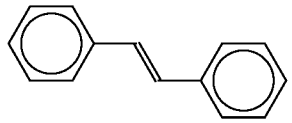
(II)

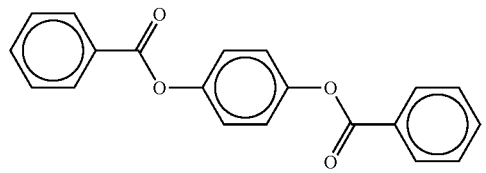
(III)

In addition to the compound as shown in FIG. 6, the photo-polymerizable end group may be selected from (meth)acrylates, epoxides, vinyl ethers and thiol-enes.

In addition to the compound as shown in FIG. 6, the flexible spacer may be selected from —(CH2)x-, —O—(CH2)x- (in which x is an integer of 0 to 12) and a chiral compound.

The refractive index anisotropy of the reactive mesogen depends on the characteristics of the central core with liquid-crystalline properties. The reactive mesogen may be used in an amount of not less than 10 vol % so that it can efficiently function to compensate phase retardation values.

The photoinitiator is a photocurable liquid polymeric precursor and is preferably contained in an amount of 1 to 3 vol %. The photoinitiator may be selected from aromatic ketones, phosphine oxides and di-functional initiators. More specifically, examples of suitable photoinitiators include 2-benzyl-2-(dimethylamino)-1-[4-(morpholinyl)phenyl]-1-butanone, phenyl bis(2,4,6-trimethyl benzoyl and 1-hydroxycyclohexyl phenyl ketone.

The di-functional initiator strengthens binding between molecules, thus improving thermal properties of the reactive mesogen contained in the spacer-integrated planarizing layer 100.

That is, the di-functional initiator renders the optical anisotropy of the reactive mesogen to be stably maintained in a wider temperature range.

The liquid crystalline material-containing resin 150 includes a mono-functional monomer so that it can be suitably coated.

As the number of functional groups increase, a reaction rate may be slowed. The use of a mono-functional monomer only may be considered to be advantageous in terms of process efficiency. However, in order to improve heat resistance and film properties of the resin 150, it is necessary to introduce poly-functional groups. Thus, the resin 150 includes a tri-functional monomer as well as a di-functional monomer.

The mono-functional monomer functions to promote the photocuring rate of the resin. To efficiently realize such a function, the mono-functional monomer is preferably in 30 to 50 vol %.

The mono-functional monomer may be selected from a vinyl monomer, CH2=CHY and CH2=CXY (in which X and Y are each independently halogen, alkyl, ester or phenyl).

The composition of the tri- and di-functional monomers may be preferably determined, taking into the consideration the efficiency of the coating process and the light-reaction rate of the resin 150.

In terms of the efficiency of the coating process, the composition of the tri- and di-functional monomers is preferably determined such that the resin 150 has a viscosity equivalent to or less than 20 Cp (centi poise). In terms of the reaction rate, the tri-functional monomer is preferably contained in an amount not more than 20 vol %.

Considering the efficiency and reaction rate, the tri- and di-functional monomers are contained in amounts of 0 to 10 vol % and 20 to 40 vol % of the total resin, respectively.

The tri-functional monomer only can impart the desired viscosity to the resin. Because a tri-functional monomer has typically a high viscosity, a di-functional monomer may be introduced to allow the viscosity of the resin to be more readily controlled.

Examples of the tri-functional monomer that may be used in the present invention include 1-(tetrahydro-4-methylene-furan-2-yl)vinyl acrylate, and 3-(2-oxooxazolidin-3-yl)buta-1,3-dien-2-yl acrylate. Examples of the di-functional monomer that may be used in the present invention include 1,6-hexanediol diacrylate (HDDA) and diethylene glycol dimethacrylate (DGDMA).

The constituent components of the resin 150 are mixed in accordance with the composition as defined above to be a total 100 vol %.

As apparent from the foregoing, the LCD panel according to the embodiment of the present invention includes, in addition to a liquid crystalline material, the spacer-integrated planarizing layer which includes a planarized surface arranged in an effective display side at each sub pixel, and a spacer pattern that is integrated with the planarized surface and protrudes from the black matrix. The spacer-integrated planarizing layer 100 simultaneously functions to improve viewing angle properties of the LCD panel, planarize the sub pixel and maintain the cell gap. In conclusion, the method for fabricating the LCD panel according to the embodiment of the present invention shortens an adhesion process of a compensation film and eliminates the necessity of separately forming a planarizing layer and a spacer, thus simplifying the overall color filter array process.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A liquid crystal display panel, comprising:
   a thin film transistor array substrate;
   a color filter array substrate opposite the thin film transistor array substrate; and
   a liquid crystal layer between the thin film transistor array substrate and the color filter array substrate,
   wherein the color filter array substrate includes:
   a black matrix partitioning sub pixels;
   a plurality of color filters at respective sub pixels; and
   a spacer-integrated planarizing layer arranged on the color filters and the black matrix,
   wherein the spacer-integrated planarizing layer includes a planarized surface at each of the sub pixels and a spacer pattern integrated with the planarized surface and protruding at the black matrix to maintain a cell gap between the thin film transistor array substrate and the color filter array substrate,
   wherein the spacer-integrated planarizing layer includes a liquid crystalline material,
   wherein the liquid crystalline material includes reactive mesogen containing a central core with liquid-crystalline properties, and a pair of photo-polymerizable end groups bound to the central core by flexible spacers.

2. The liquid crystal display panel according to claim 1, further comprising an alignment film between the color filters and the spacer-integrated planarizing layer.

3. The liquid crystal display panel according to claim 1, wherein the spacer-integrated planarizing layer includes a liquid crystalline material-containing resin.

4. The liquid crystal display panel according to claim 1, wherein the sub pixels include red, green, blue and transparent sub pixels and the color filters are formed in the red, green and blue sub pixels.

5. The liquid crystal display panel according to claim 1, further comprising an alignment film on the spacer-integrated planarizing layer.

6. The liquid crystal display panel according to claim 1, further comprising a common electrode arranged between the color filters and the spacer-integrated planarizing layer.

7. The liquid crystal display panel according to claim 6, further comprising an alignment film arranged between the common electrode and the spacer-integrated planarizing layer.

8. A method of manufacturing a liquid crystal display panel, comprising:
   forming a color filter array substrate;
   positioning the color filter array substrate opposite to a thin film transistor array substrate; and
   forming a liquid crystal layer between the thin film transistor array substrate and the color filter array substrate,
   wherein the step of forming the color filter array substrate includes:
   forming a black matrix partitioning sub pixels;
   forming a plurality of color filters at respective sub pixels; and
   forming a spacer-integrated planarizing layer arranged on the color filters and the black matrix,
   wherein the spacer-integrated planarizing layer includes a planarized surface at each of the sub pixels and a spacer pattern integrated with the planarized surface and protruding at the black matrix to maintain a cell gap between the thin film transistor array substrate and the color filter array substrate,
   wherein the spacer-integrated planarizing layer includes a liquid crystalline material,
   wherein the liquid crystalline material includes reactive mesogen containing a central core with liquid-crystalline properties, and a pair of photo-polymerizable end groups bound to the central core by flexible spacers.

9. The method of claim 8, further comprising forming an alignment film between the color filters and the spacer-integrated planarizing layer.

10. The method of claim 8, wherein the spacer-integrated planarizing layer includes a liquid crystalline material-containing resin.

11. The method of claim 8, wherein the sub pixels include red, green, blue and transparent sub pixels and the color filters are formed in the red, green and blue sub pixels.

12. The method of claim 8, further comprising forming an alignment film on the spacer-integrated planarizing layer.

13. The method of claim 8, further comprising forming a common electrode arranged between the color filters and the spacer-integrated planarizing layer.

14. The method of claim 13, further comprising forming an alignment film arranged between the common electrode and the spacer-integrated planarizing layer.

15. The method of claim 8, wherein the step of forming the spacer-integrated planarizing layer includes:

preparing a resin including 30 to 40 vol % of a mono-functional monomer, 20 to 40 vol % of a di-functional monomer, 0 to 20 vol % of a tri-functional monomer, 10 vol % or more of the reactive mesogen and 1 to 3 vol % of a photoinitiator, based on a total 100 vol % of the resin;

molding the resin using a soft mold having a pattern corresponding to the planarized surface at each of the sub-pixels and the spacer pattern protruding at the black matrix; and photo-curing the resin.

* * * * *